Jan. 17, 1956 H. L. FROHMAN 2,731,269

REBUS PUZZLE COMPUTER

Filed June 19, 1953 2 Sheets-Sheet 1

INVENTOR.

Howard L. Frohman

BY

McMorrow, Berman & Davidson

ATTORNEYS

Jan. 17, 1956 H. L. FROHMAN 2,731,269

REBUS PUZZLE COMPUTER

Filed June 19, 1953 2 Sheets-Sheet 2

INVENTOR.

Howard L. Frohman

BY

McMorrow, Berman & Davidson

ATTORNEYS

United States Patent Office 2,731,269

Patented Jan. 17, 1956

2,731,269

REBUS PUZZLE COMPUTER

Howard L. Frohman, New Haven, Conn.

Application June 19, 1953, Serial No. 362,873

2 Claims. (Cl. 273—148)

This invention relates to puzzles, and more particularly to an improved apparatus for the solving of rebus puzzles.

The main object of the invention is to provide a novel and improved computing device for use in solving rebus puzzles, said computing device being simple in construction, being easy to manipulate, and enabling the user to greatly reduce the time involved in working out a rebus puzzle.

A further object of the invention is to provide a novel and improved computing board for use in solving rebus puzzles, said board involving inexpensive components, being compact in size, and involving simple parts, the apparatus enabling a person working on a rebus puzzle to tracts words and letters that spell out identifications of pictured objects, so as to have a remainder of letters that spell out a name or word. For example:

cone+elephant+E−telephone=cane

After cancelling, by subtracting the minus letters from the plus letters, the puzzle looks like this:

~~cone~~+~~elephant~~+E−~~telephone~~=cane

The above is an example of a simple rebus puzzle worked out by cancelling by hand.

The rebus puzzle computing apparatus of the present invention would solve the same problem automatically as follows:

First the word-elements are spelled out by placing appropriate pegs in respective bores in a strip member to be placed on a board. Thus, each strip member represents a word. By manually moving a strip member from the "plus" board to the "minus" board, the entire value of the word can be changed from plus to minus, and vice versa. When a puzzle is quite large, the convenience of this becomes readily apparent, for if the puzzle is being worked by pencil and paper, the entire wordage must sometimes be rewritten.

Once the strip members are placed in the "plus" and "minus" boards, the rebus puzzle computer of the present invention appears as follows:

PLUS BOARD

| | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| (CONE) | | | C | | E | | | | | | | | | N | O | | | | | | | | | | | |
| (ELEPHANT) | | | | | E | | | | | | | | | | | | | | | | | | | | | |
| | A | | | | E | | | H | | | | L | | N | | P | | | | T | | | | | | |
| (E) | | | | | E | | | | | | | | | | | | | | | | | | | | | |

MINUS BOARD

| | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| | | | | | E | | | | | | | | | | | | | | | | | | | | | |
| | | | | | E | | | | | | | | | | | | | | | | | | | | | |
| (TELEPHONE) | | | | | E | | | H | | | | L | | N | O | P | | | | T | | | | | | |

quickly compute the sum of the alphabetical letters of a group of words, whereby the respective letters may be rapidly tallied and the letters may be canceled out, leaving the letters from which the solution of the puzzle can be found after all the unwanted letters are canceled.

Further objects and advantages of the invention will become apparent from the following description and claims, and from the accompanying drawings, wherein:

Figure 1:
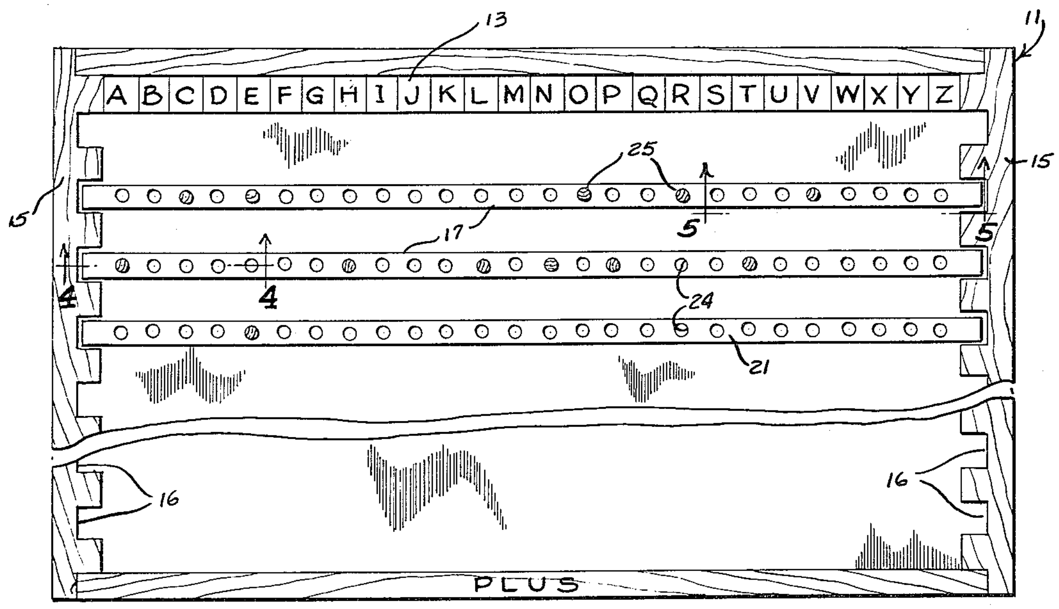
Figure 1 is a fragmentary top view of the "plus" board of a rebus puzzle solving apparatus according to the present invention.
Figure 2:
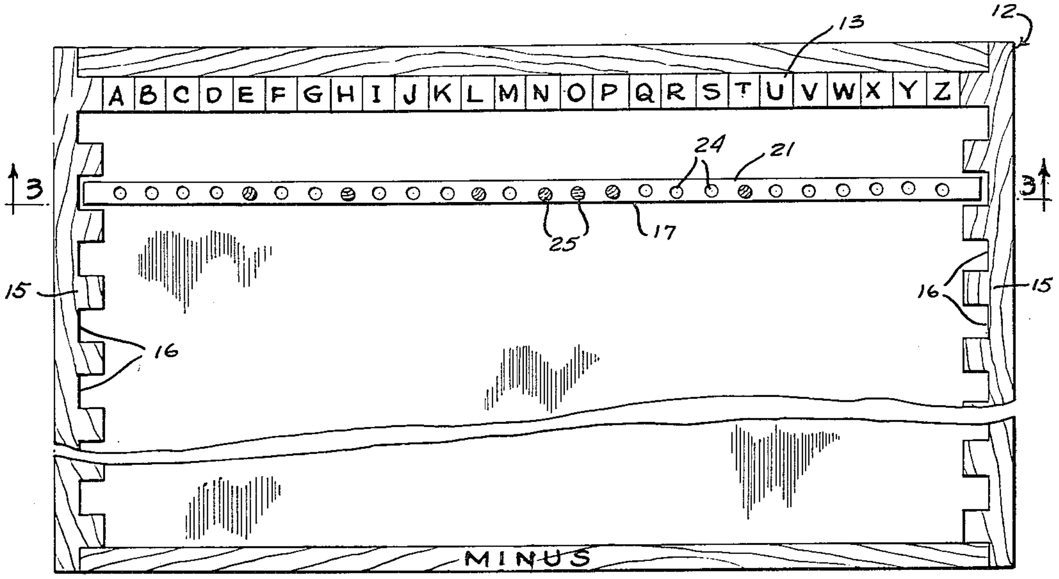
Figure 2 is a fragmentary top plan view, similar to Figure 1, of the "minus" board of a rebus puzzle solving apparatus according to this invention.

A rebus puzzle is a type of puzzle that adds and sub-

Merely by inspection the following is apparent:

| | A | C | E | H | L | N | O | P | T |
|---|---|---|---|---|---|---|---|---|---|
| PLUS: | 1 | 1 | 4 | 1 | 1 | 2 | 1 | 1 | 1 |
| MINUS: | 0 | 0 | 3 | 1 | 1 | 1 | 1 | 1 | 1 |
| REMAINDER: | 1 | 1 | 1 | 0 | 0 | 1 | 0 | 0 | 0 |

or, CANE is the solution.

The above example is a very elementary sample of what constitutes a rebus puzzle. When a puzzle contains hundreds of words, or elements (and they sometimes do in some tie-breaking puzzles where thousands of dollars are awarded in prizes), the puzzle becomes tremendously complicated, and a worth-while solution is most difficult to attain by the hand method. With my rebus puzzle computer a solution can be rendered accurately, quickly, and with a minimum of effort.

Referring to the drawings, 11 designates the "plus" board and 12 designates the "minus" board of a computing apparatus employed for computing the sum of the letters of respective groups of words in a rebus puzzle.

As is well known, in solving a rebus puzzle, a group of words must be broken down into their component alphabetical letters, one group of words involving letters to be added and the other group of words involving letters to be subtracted from the respective corresponding letters of the first group, whereby by examining the remaining letters the solution of the puzzle may be worked out. Thus, a first group of words must be broken down into their respective alphabetical letters, and for this purpose the board 11 is provided. The board 11 is generally rectangular in shape, as shown in Figure 1, and is provided along one longitudinal margin thereof with a sequential arrangement of the letters of the alphabet, shown at 13, each letter of the alphabet being inscribed in a box, as illustrated. The opposite ends of the board are provided with the upstanding ribs or flanges 15, 15, said ribs or flanges 15 being formed with the spaced notches 16, the notches 16 of the opposing ribs 15 being longitudinally aligned with each other. Designated at 17 are respective longitudinally extending strip members whose ends are adapted to be received in opposing notches 16 of the end ribs 15, as illustrated in Figure 1.

Figure 3:
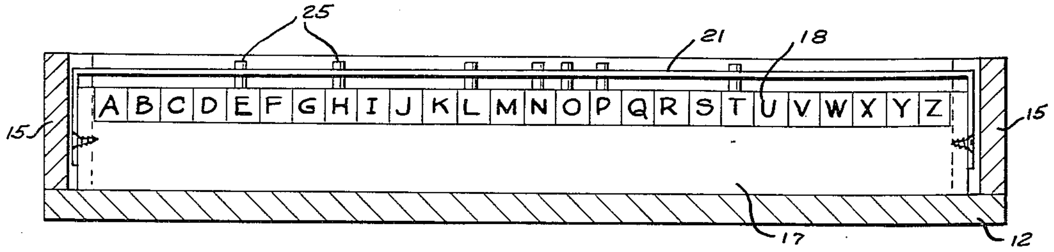
Figure 3 is a vertical cross sectional view taken on the line 3—3 of Figure 2.
Figures 4, 5:
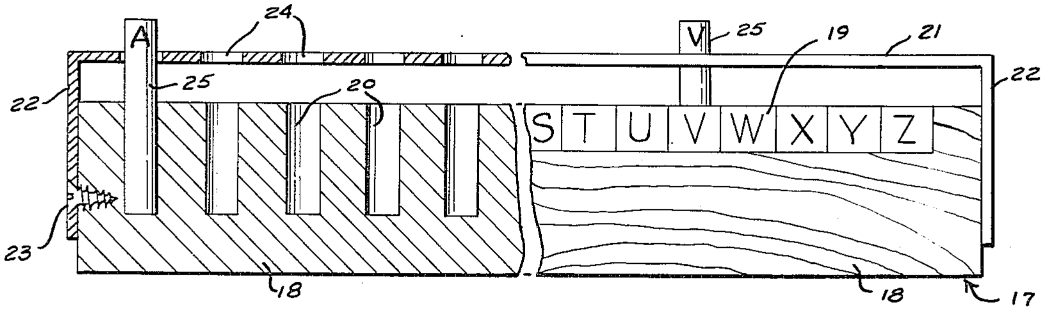
Figure 4 is an enlarged vertical longitudinal cross sectional view taken on the line 4—4 of Figure 1 through one of the tally strip members employed in the rebus puzzle solving apparatus.
Figure 5 is a fragmentary elevational detail view of a tally strip member employed in the apparatus, said view being taken on the line 5—5 of Figure 1.

As shown in Figures 3, 4 and 5, each strip member 17 comprises a bar member 18 of substantially rectangular cross section, the upper portions of the sides of the bar member being inscribed with the alphabet 19, the respective letters of the alphabet extending along the upper marginal portion of the side of the bar member, as shown in Figure 5. The bar member is formed with the spaced vertical bores 20, said bores being respectively aligned with the respective letters of the alphabet 19, the bores 20 opening at the top surface of the bar member. Designated at 21 is a guide bar having the downwardly bent ends 22, 22 extending substantially perpendicular to the main body portion of the guide bar 21, the ends 22, 22 being secured to the ends of the strip member 18, as by screws 23 in the manner illustrated in Figure 4. The guide bars 21 are formed with the spaced openings 24 which are in vertical registry with the respective bores 20 and are spaced thereabove, as shown in Figures 4 and 5, serving as guide means for the insertion of pegs 25 into the bores 20.

Figure 6:
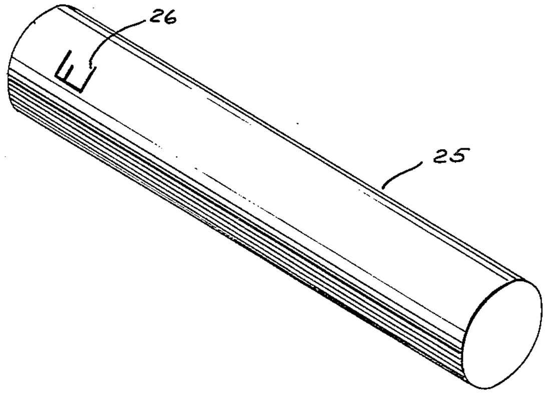
Figure 6 is an enlarged perspective view of one of the tallying pegs employed in the apparatus of the present invention.

Referring to Figure 6, each peg 25 is generally cylindrical in shape and is inscribed adjacent one end thereof with reference letters 26, indicating that the peg designates a given alphabetical letter.

Thus, each of the strip members 17 may be employed to designate the respective letters of one of the words of the rebus puzzle, a peg 25 being inserted in a bore 20 for each letter appearing in the word. For example, to designate a word "cover" in the first strip member shown in Figure 1, pegs 25 will be inserted in the bores 20 corresponding to the alphabetical letters in said word.

Thus, the strip members 17 may each represent a word or a portion of one of the words in a group of words of a rebus puzzle, the pegs 25 being employed to designate each of the letters appearing in the word or partial word. With the appropriate pegs 25 in the bores 20 of each strip member 17, the strip members are placed in the notches 16, as shown in Figure 1, the ends of each strip member being received in opposing notches 16, whereby the group of strip members are disposed on the board 11 as illustrated. Then the user may rapidly count the number of pegs 25 aligned with each of the letters on the alphabet 13 at the longitudinal margin of the board. At the same time, a similar procedure may be employed for the "minus" board 12, whereby the words having letters to be subtracted may be represented by means of pegs 25 on strip members 17. By counting the respective aligned rows of pegs 25 on the boards 11 and 12, the user may rapidly determine which letters are canceled, since when an equal number of pegs occurs on the boards 11 and 12 for a given alphabetical letter cancellation of these letters is accomplished automatically and immediately. With the canceled letters eliminated the letters remaining on the plus board can be used as a solution to the puzzle.

To minimize error, the "plus" board may be painted a different color from the "minus" board, as by painting the "plus" board black or blue and by painting the "minus" board 12 red or a similar contrasting color with respect to the color of the board 11. As will be readily understood by those familiar with rebus puzzles, pictures are ordinarily provided to designate the words forming the rebus puzzle. The user may set up the various words on the strip member 17, in the manner above described, and then by manually manipulating the strip members may readily determine which letters are to be canceled.

For example, by interchanging strip members 17 until an equivalent number of a given letter occurs on the "plus" board 11 as on the "minus" board 12, it is discovered that these letters are canceled. The strip members 17 are moved from board 11 to board 12 and vice versa until all the unwanted letters are canceled out, or until all are canceled out that can be canceled. Cancellation of letters is accomplished by removing the pegs 25 indicating such letters. After all possible letters have been canceled out, the solution of the puzzle can be determined by properly arranging the remaining letters indicated by the pegs 25 left in the strip members 17.

The strip members 17 are arranged so that the pegs 25 may be rapidly and easily inserted in the bores 20, since the guide bars 21 are provided with the perforations 24, above described, which are in vertical alignment with the respective bores 20, whereby pegs may be rapidly inserted through the openings 24 and are guided into the bores 20.

While a specific embodiment of an improved rebus puzzle computer has been disclosed in the foregoing description, it will be understood that various modifications within the spirit of the invention may occur to those skilled in the art. It should be understood that the present disclosure is for the purpose of illustration only, and that this invention includes all modifications and equivalents which fall within the scope of the appended claims.

What is claimed is:

1. A rebus puzzle computer comprising a board inscribed adjacent to and inwardly of the marginal edge thereof with letters of the alphabet, support members on the board along the marginal edge of said board, strip members each having on a side face the letters of the alphabet inscribed thereon positioned in spaced relation inwardly of the marginal edge of said board and engageable with said support members, said strip members being shaped so that the letters of the alphabet are in registry with each other and with the letters of the alphabet adjacent the marginal edge of said board, each of said strip members being formed with a plurality of bores extending inwardly from the top face thereof and in registry with the letters of the alphabet on the side face thereof, and pegs conformably shaped to fit the bores in said strip members insertable in the bores in accordance with the letters of a word to be tabulated in solving a rebus puzzle.

2. A rebus puzzle computer comprising a board inscribed adjacent to and inwardly of the marginal edge thereof with the letters of the alphabet, support members on the board along the marginal edges of said board, strip members each having on a side face the letters of the alphabet inscribed thereon positioned in spaced relation inwardly of the marginal edge of said board and engageable with said support members, said strip members being shaped so that the letters of the alphabet are in registry with each other and with the letters of the alphabet adjacent the marginal edge of said board, each of said strip members being formed with a plurality of bores extending inwardly from the top face thereof and in registry with the letters of the alphabet on the side face thereof, a guide bar arranged in superimposed spaced relation with respect to each strip member, each bar being provided with a plurality of apertures in registry with the bores of the adjacent strip member, and pegs conformably shaped to fit the apertures in the guide bars and the bores in said strip members insertable into the apertures of said guide bars and the bores of said strip members in accordance with the letters of a word to be tabulated in solving a rebus puzzle.

References Cited in the file of this patent

UNITED STATES PATENTS

| | | |
|---|---|---|
| 905,578 | Read | Dec. 1, 1908 |
| 1,169,886 | Sultzbach | Feb. 1, 1916 |